United States Patent [19]

Brost

[11] Patent Number: 4,903,225

[45] Date of Patent: Feb. 20, 1990

[54] HIGH SPEED DIGITAL DATA CORRELATOR HAVING A SYNCHRONOUS PIPELINED FULL ADDER CELL ARRAY

[75] Inventor: Andrew C. Brost, San Jose, Calif.

[73] Assignee: Ampex Corporation, Redwood City, Calif.

[21] Appl. No.: 290,717

[22] Filed: Dec. 23, 1988

[51] Int. Cl.⁴ .......................................... G06F 15/336
[52] U.S. Cl. .................................. 364/728.03; 375/96
[58] Field of Search ......... 364/728.03, 728.05–728.07, 364/715.06; 375/96

[56] References Cited

U.S. PATENT DOCUMENTS

| | | | |
|---|---|---|---|
| 3,522,541 | 8/1970 | Gooding | 325/324 |
| 3,604,911 | 9/1971 | Schmitt | 364/728.03 |
| 3,681,579 | 8/1972 | Schweitzer | 235/181 |
| 3,982,114 | 9/1976 | Hook | 235/181 |
| 4,012,627 | 3/1977 | Antoniak | 364/715.06 X |
| 4,028,490 | 6/1977 | Epstein | 178/88 |
| 4,057,759 | 11/1977 | Genova et al. | 325/320 |
| 4,489,393 | 12/1984 | Kawahara et al. | 364/728 |
| 4,498,141 | 2/1985 | Cooper | 364/728 |
| 4,568,915 | 2/1986 | Gutleber | 340/347 |
| 4,593,378 | 6/1986 | McWhirter et al. | 364/728.03 X |
| 4,660,164 | 4/1987 | Leibowitz | 364/728.03 |
| 4,660,165 | 4/1987 | Masumoto | 364/787 |
| 4,665,533 | 5/1987 | Tomikawa | 375/106 |
| 4,679,210 | 7/1987 | Rathi | 375/96 |
| 4,757,464 | 7/1988 | Zimmermann et al. | 364/715.06 |
| 4,817,014 | 3/1989 | Schneider et al. | 364/728.03 |
| 4,833,694 | 5/1989 | Young et al. | 364/728.03 X |

OTHER PUBLICATIONS

VLSI Data Book, by TRW Electronics Components Group 1985, pp. I29-I41.

Primary Examiner—Gary V. Harkcom
Assistant Examiner—Tan V. Mai
Attorney, Agent, or Firm—Elizabeth E. Strnad; Richard P. Lange

[57] ABSTRACT

High speed digital data correlator utilizing as a summing circuit single bit full adder cells in a synchronous pipelined array arrangement to sum the number of bit matches with a selected correlation word in a serial data stream. Each adder cell has up to three inputs and provides a partial sum by adding up to three bits of equal powers of two. The simple full adder cell architecture minimizes interconnect lengths between the adjacent synchronous stages of the summing circuit and maintains near constant circuit density across the stages. These features contribute to an optimization of the operational speed of the correlator for any given circuit technology. The correlator of the preferred embodiment detects two complementary, mutually exclusive correlation words, using the same correlation circuit.

11 Claims, 4 Drawing Sheets

HIGH SPEED DIGITAL DATA CORRELATOR HAVING A SYNCHRONOUS PIPELINED FULL ADDER CELL ARRAY

This invention was developed under a U.S. Government contract and the Government has a license under this patent.

The invention relates to an apparatus for detecting a known correlation word in a high speed information data stream corrupted by random bit errors. The apparatus comprises all digital components and is capable of processing high bit rate serial data streams.

BACKGROUND OF THE INVENTION

Digital correlators are known to detect the presence of a predetermined sequence of digits, generally referred to as a correlation word, in a data stream. The correlation word is inserted into the data stream prior to transmission. Upon reception, the occurrence of the correlation word is detected by a correlation circuit and utilized to synchronize the operation of the receiving device. For example, in rotary head magnetic recorders it is known to record a known digital correlation word on tape at the beginning of each head path. At playback, presence of the correlation word is detected and utilized to synchronize the playback signal. In some applications it is desirable to detect two such synchronization signals, that is two different correlation words, for example one indicating the beginning of a scan or frame off tape, further referred to as a frame sync, and the other indicating the beginning of each data block within the frame, referred to as a block sync.

Generally, the known correlation word is stored in a memory, or on an electronic template. The incoming serial data stream is applied to a serial shift register, where it is shifted bit wise at the serial data rate. After each shift the data in the register is compared with the stored correlation word. Each matching bit produces a logic "true" output signal level, for example a logic one. The bits which do not match produce a "false" logic level, for example a logic zero. The number of matching bits is summed in a summing circuit, and the resulting sum is compared to a threshold. When the sum is below the threshold, it is assumed that the data in the shift register does not correspond to the correlation word. When the sum is equal to or exceeds the threshold, the correlation word is detected.

In high speed applications it is essential to maintain the speed of operation of the summing circuit at a maximum. Specifically, when using a synchronous digital summing circuit, the rate of clocking the data through that circuit must be equal to the input data rate, so that at each bit time a correlation result may be determined. High order binary summing circuits are known to operate at relatively slow speed, and when used in digital correlators, the operational speed of the entire correlation circuit is limited. Particularly, such summing circuits are not suitable in applications where it is necessary to detect relatively long correlation words in a high speed digital data stream. These circuits would generally slow down the correlation process, and thereby limit the application to slower data rates.

An example of a typical binary adder circuit having a parallel pipelined structure for handling summation and carry bits separately, is described in U.S. Pat. 4,660,165 to R. T. Masumoto. That type of circuit, referred to as pyramid carry adder, includes at each stage multiple bit adders. Each such multiple bit adder receives input addends of more then one binary order, in addition to a carry bit, and outputs a partial sum of the received addends The first stage produces as outputs multiple sum bits and a carry bit One or more additional stages separately combine partial sum outputs and carry outputs obtained from the previous stages, and produce separate carry and sum output bits in such a way that the number of carry bits is reduced As it is well known, the higher the order of an adder stage, the deeper the level of combinational logic utilized in the adder circuit, and therefore the longer the operational delay provided by that stage. While this known circuit operates entirely in the digital environment, its speed of operation, that is the rate of data to be processed, is limited by its slowest combinational logic path, which is the one having the highest level of combinational logic delay As a further disadvantage, multibit adders are located further apart from each other and occupy a relatively large area on the silicon chip. Therefore, relatively long connecting lines are needed for sum and carry bits between the consecutive adder stages. With longer interconnect lines the routing delay time between each stage of the summing circuit increases, thereby also limiting the operating speed and obtainable bit rate for the overall data correlator circuit. In addition, the above mentioned pyramid type adders have a high density of logic elements at the input, with progressively decreasing density towards the output, thus creating a "funneling" effect in the distribution of logic circuit elements. In order to efficiently utilize the area of the silicon chip where the summing circuit is formed, the funneled circuit must be typically spread out over a square or rectangular area, whereby the routing distances between adjacent stages increase. Consequently, to increase the speed of operation it is desirable to provide a more even distribution of elements with minimized routing length between adder stages from the input to the output of the overall summing circuit.

Because of the relatively slow operational speed obtainable by known digital summing circuits, high speed data correlators have been known to utilize analog circuits for summing the number of bit matches resulting from the comparison with the correlation word. One such high speed correlator is described for example in U.S. Pat. No. 4,498,141, assigned to the assignee of this patent application. In that correlator for each bit match a known analog signal change is provided on a common terminal. Thus the high speed analog signal changes on the common terminal are proportional to the number of bit matches and they correspond to the summed analog signal. The changing analog signal on the common terminal is compared with an analog reference threshold signal to detect presence of the correlation word in the data stream. This particular correlator is capable of operating at a data rate over 100 MHz. This analog correlator however requires many discrete parts, is subject to noise pick-up, and has a less accurate threshold detection because of its sensitivity to component tolerances and temperature.

SUMMARY OF THE INVENTION

The objects, features and advantages of the present invention are summarized below. The high speed digital data correlator of the present invention utilizes a synchronous pipelined single bit full adder cell array. Each full adder cell has up to three inputs, each receiving a single bit of equal order of magnitude, a summation output, and a carry output. Because of the lowest level of combinational logic provided in the full adder cell, each adder stage occupies minimum space on the chip, thus minimizing the length of the necessary interconnections between the consecutive stages. Signal propagation delays from stage to stage are thus reduced in two ways, that is by minimizing the combinational logic delay and interconnect delays as well.

It is a further advantage of the correlation circuit of the present invention that the circuit density across the consecutive pipeline stages is more evenly distributed than in the above described pyramid adder circuit. Consequently, the available surface area on the silicon chip is better utilized in comparison with the pyramid design, leading to a more uniform component distribution and minimized routing lengths.

In addition to the foregoing advantages, all the adder cells are identical, thereby making the circuit design less complicated, repeatable and less costly to manufacture.

It follows from the foregoing that the circuit of the present invention is suitable for high speed, high data rate digital signal correlation utilizing long correlation words. A the same time, the circuit has all digital components, making it less sensitive to component variations in comparison to analog correlators.

In addition to the foregoing advantages, the correlation circuit of the preferred embodiment is capable of detecting two mutually exclusive, complementary correlation words, utilizing common circuit elements.

The above-indicated and other features, objects and advantages of the digital correlator of the invention will be better understood from the following detailed description in which the preferred embodiment is described with reference to the accompanying drawings.

DETAILED DESCRIPTION

Figure 1A:
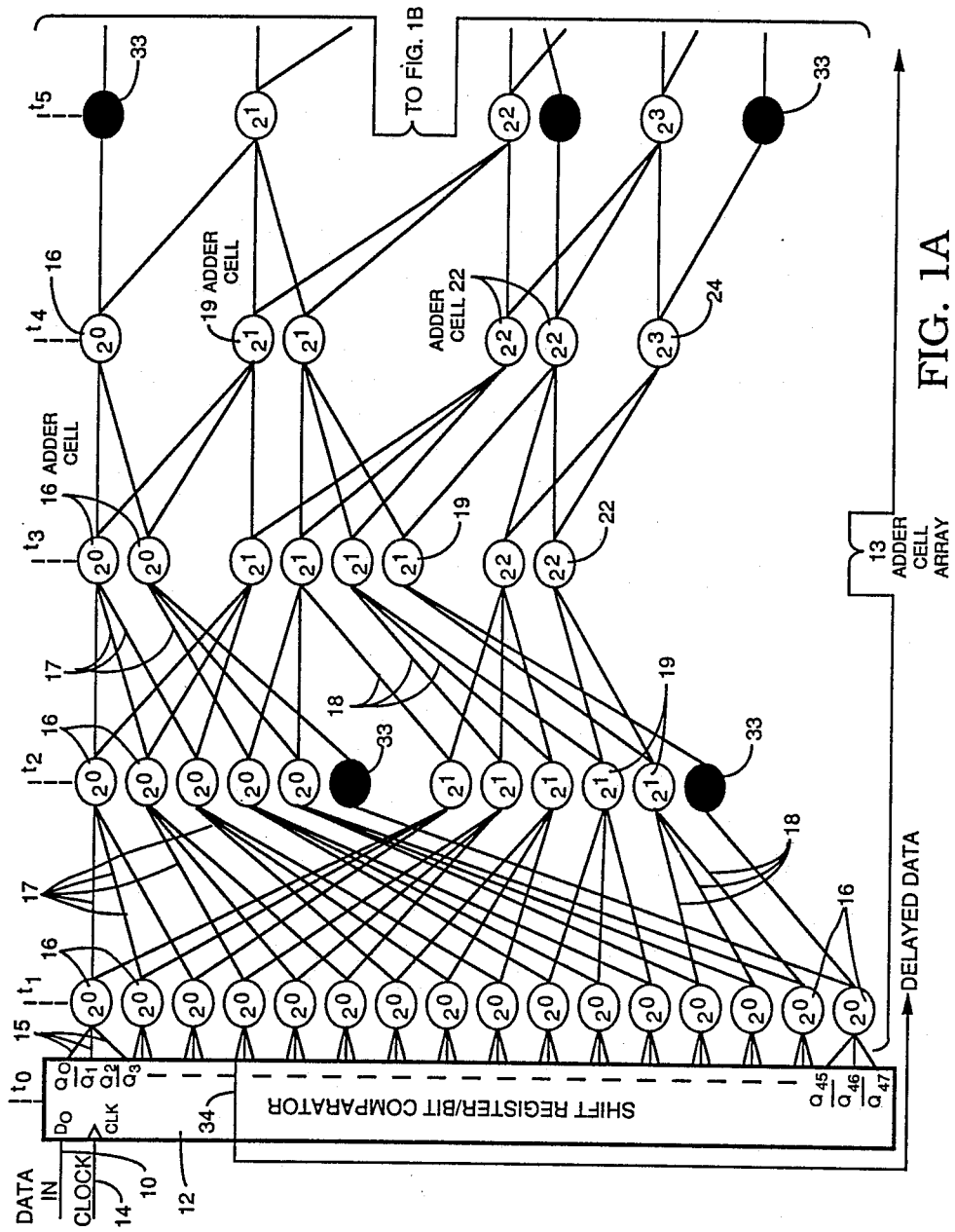
FIG. 1 has two consecutive portions designated as FIG. 1A and FIG. 1B, depicting a simplified circuit diagram, partially in block diagram form, showing a high speed digital signal correlator in accordance with the preferred embodiment of the invention.
Figure 1B:
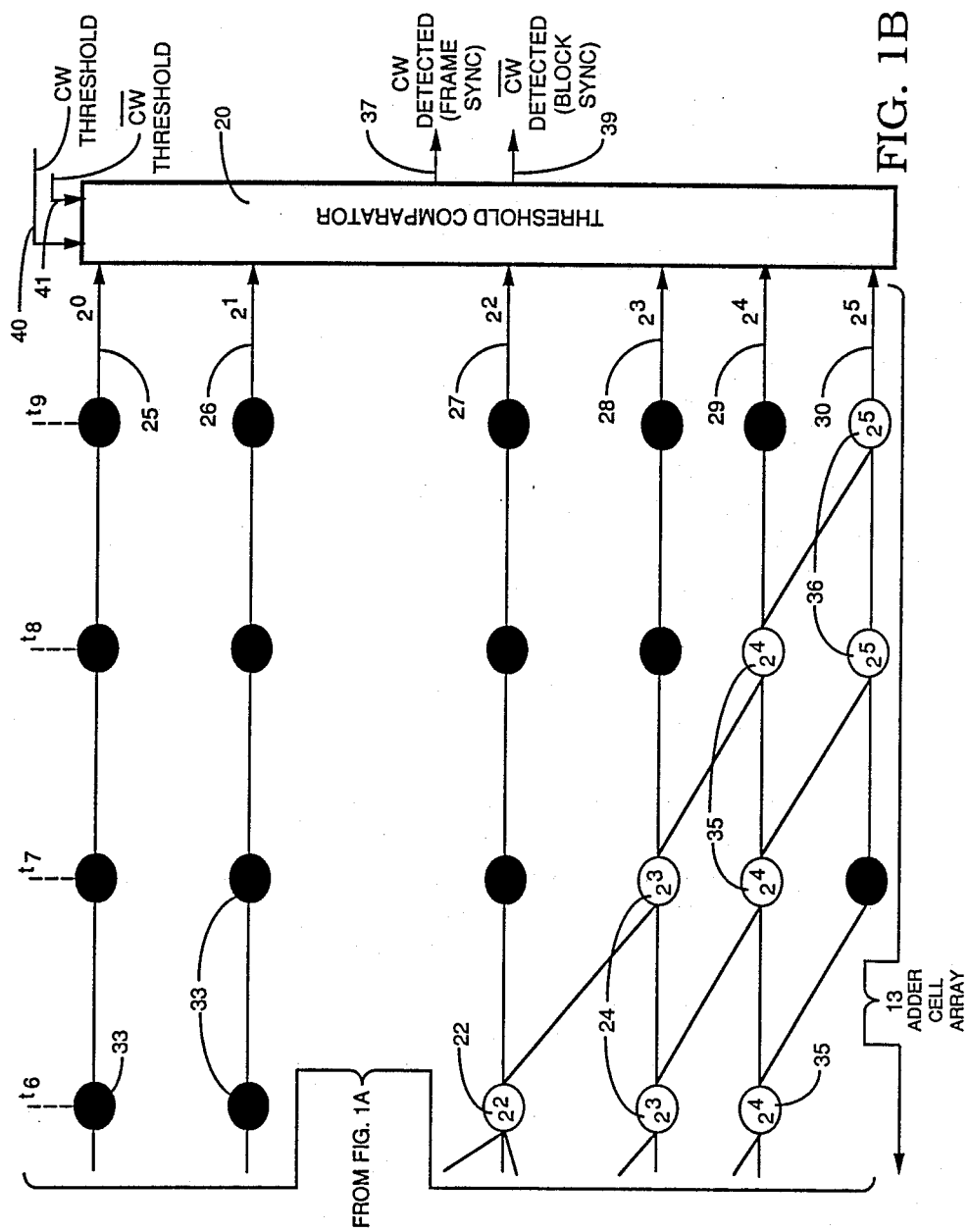

It is noted that corresponding elements in all the drawing Figures are designated by similar reference numerals to facilitate comparison. With further reference to FIG. 1, a serial data stream is received on line 10 for example, at a clock rate of 40 MHz, and applied to an input D0 of a serial-to-parallel shift register 12. A clock signal, synchronous with the data, is applied on line 14 to the shift register by a suitable clock generator (not shown), as it is for example known to be utilized in clock recovery systems. The data stream contains a recurring block of data having a known sequence of bits and a predetermined length, which in this embodiment is selected to be 48 bits long. The above-indicated block of data will be further referred to as a correlation word, such as is known to be utilized for synchronization in data transfer applications including communication systems, digital magnetic recording/playback and other well known systems. The selected correlation word is inserted into the data stream by any of the techniques well known in the art, prior to being received on line 10.

For example, a selected first correlation word may be stored in a memory (not shown), and the memory output may be switched into the data stream at a predetermined time, such as at the beginning of each magnetic recording head path or scan on tape, as it is well known in the art of magnetic tape recording, and generally referred to as a frame sync. In this example, a second correlation word, which is the binary complement of the first correlation word, is also inserted into the data stream to indicate the beginning of each data block within the frame, generally referred to as a block sync, utilizing well known techniques.

The shift register 12 is preferably of a conventional type, having 48 D-type flip-flops (not shown), connected in series. A hardware simplification is obtained by using the shift register also as a template comparator, as follows. As it is well known in the art, each D-type flip-flop has a data input D, a clock input, and a non-inverting and inverting parallel output Q, Q- bar, respectively. Each clock signal applied on line 14 causes the input data on line 10 to progressively shift by one bit position within the shift register 12 through the series connected flip-flops. As the data is shifted, it is compared at each clock time in parallel with the 48-bit correlation word stored on a template to determine a "match" or "no match" as follows.

One of the Q or Q-bar outputs of each flip-flop is connected as an output from the shift register for the template comparison, as follows. For each bit of the correlation word having a value 1 a non-inverting Q output of a corresponding flip-flop is connected to one of the respective parallel inputs of the following summing circuit 13. For each bit of the correlation word having a value 0 an inverting output Q-bar of the corresponding flip-flop is connected to an input of the summing circuit 13. Consequently, for each input data bit 1 when applied to a particular flip-flop a "match" will be indicated by outputting a 1 from its non-inverting output Q, while for each input data bit 0 applied to that flip-flop a "no match" 0 will be outputted by that output. Analogously, for each input data bit 1 when applied to a particular flip-flop a "no match" will be indicated by outputting a 0 from its inverting output Q-bar, and for each 0 input data bit applied to that output a 1 will be outputted, indicating a "match".

As it is seen from the circuit of FIG. 1, in this particular example the template connections at the non-inverting outputs Q0, Q2, and Q45, corresponding to a "true" or "match" logic level 1 were selected as outputs from the shift register 12 for their corresponding flip-flop inputs equal to 1, along with the connections at inverting outputs Q1-bar, Q3-bar, Q46-bar and Q47- bar, corresponding to a "true" or "match" logic level 1 for their corresponding flip-flop inputs equal to 0. Thus the above-indicated, as well as other selected non-inverting outputs from the shift register 12 each will output a 1, indicating a "match" when an input bit 1 is applied to their respective corresponding flip-flops. However, the above-indicated non-inverting outputs each will output a 0, indicating "no match" when an input bit 0 is applied to their respective flip-flops. Analogously, the above-indicated and other inverting outputs of the shift register will output a 1, indicating "match" when an input bit 0 is applied to their corresponding flip-flops, and they will output a 0, indicating "no match" when an input bit 1 is applied.

Preferably the template connections are programmable, to select an inverted or non-inverted output signal from each flip-flop. This may be done for example by having selectable complementary outputs at each flip-flop output, as it is well known in the art. This way the selected correlation word may be conveniently changed, if desired, without altering the hardware connections.

In accordance with the present invention, all the bit matches, indicated by the bit 1 output values from the template are summed by a summing circuit 13 which is provided as a synchronous pipelined single bit full adder cell array circuit, as it is shown by example in FIG. 1 and will be described below.

It follows from the foregoing description that when all 48 bits of the incoming data stream, which are present in the shift register, match with the correlation word stored on the template, all 48 parallel outputs from the shift register will output a logic 1. The sum of matching bits provided by the summing circuit will equal 48, and the output from the correlator will indicate that the first correlation word has been detected. However, when not all of the bits match, those non-matching bits will have a 0 output from the shift register 12, and the sum will be less than 48. On the other hand, when none of the bits match, all the outputs from the shift register 12 will have a 0 value, which situation corresponds to a sum equal to zero, whereby the complementary, second correlation word will be detected by the correlator.

In the preferred embodiment the sum provided by the summing circuit 13 of FIG. 1 is compared with a predetermined high or low threshold in a threshold comparator 20 as follows. For example during start-up operation, that is before the operation of the recording/playback device is synchronized with the off-tape data stream, a high threshold is applied on control lines 40 and 41, that is, an exact match for all 48 bits on the template is required and no bit errors are tolerated in the correlation word CW, or in the complementary correlation word CW-bar. Thus in this case the high threshold CW on line 40 is selected equal to 48, and the high threshold CW-bar on line 41 is selected equal to 0.

After the operation of the device is locked to the input data stream, a low threshold may be applied on control lines 40 and 41, to tolerate some errors in the correlation words CW and CW-bar. Thus in this example for the low threshold up to seven bit mismatches are tolerated. Therefore when the sum is between 48 and 41, the first low threshold correlation word is detected and a frame sync pulse CW is output on line 37. When the sum is between 0 and 7, detection of the second, complementary low threshold correlation word is indicated by outputting from the comparator 20 a block sync pulse CW-bar on line 39. Thus, when the sum is between 8 and 40, it is an indication that neither of the two correlation words has been detected.

With further reference to FIG. 1, each parallel output of the shift register 12 is connected to one input of a single bit full adder cell 16. Each adder cell has up to three inputs and two outputs, each input being connected to one selected non-inverting or inverting output Q0 to Q47, or Q0-bar to Q47- bar of the shift register, to obtain the previously described template. All the adder cells of the summing circuit 13 are of identical design and will be described now with reference to FIG. 2.

Figure 2:
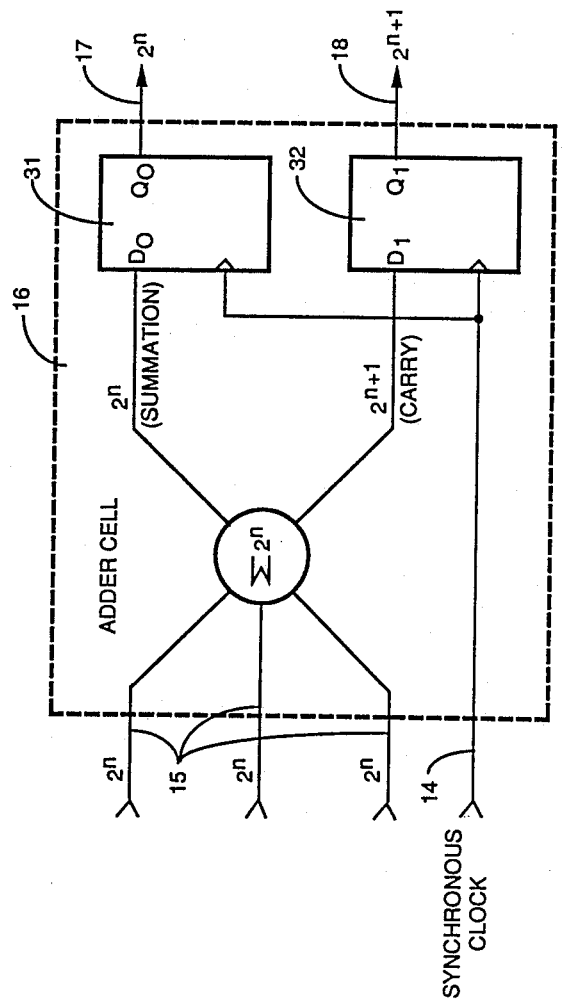
FIG. 2 is a more detailed circuit diagram of a three input, two output full adder cell utilized in the circuit of FIG. 1.

FIG. 2 shows a single bit full adder cell 16 of a well known design, which is utilized in the pipelined logic adder cell array 13 in accordance with the preferred embodiment of the invention. The adder cell 16 has three input lines 15, each carrying a single bit of the same order of magnitude 2 exp(n). Thus the cell 16 may receive 1 to 3 input bits, all of the same order 2 exp (0) from the shift register 12, indicating a match or a no match. It provides internally a partial sum of these input bits on a summation line carrying a summation bit of the same order as the input bits, and a carry line, carrying a carry bit of the next higher order of magnitude 2 exp(n+1), to two flip-flops 31, 32, respectively, internal to each adder cell of the pipelined cell array 13. The flip-flops receive a clock signal on line 14 and flip-flop 31 outputs a summation bit on line 17, and flip-flop 32 outputs a carry bit on line 18, synchronously with the clock.

With further reference to FIG. 1, the above-described adder cells of the same type as shown at 16 in FIG. 2, are utilized in all the stages of the synchronous pipelined adder cell circuit 13. To better illustrate operation, in FIG. 1 consecutive adder stages of the circuit 13, and corresponding consecutive clock cycles t0 to t9 are indicated to illustrate synchronous clocking of the partial sum through the circuit 13. Each adder cell 16 in the first stage corresponding to t1 is connected in parallel via lines 15, at its input to one selected Q or Q-bar output of the shift register 12, as previously described. Because all the adder cells are identical, any cell 16 may be connected to any appropriately selected shift register output. Therefore the adder which is the closest to any shift register output will be connected thereto, thereby minimizing the length of the signal path and thus the signal delay, as it is necessary for higher data rate operation. The adder cells in the first stage thus provide a partial sum of the template matches from the shift register 12, each adding up to three single bit matches of the order 2 exp 0. The output lines 17 of each adder cell 16 carry summation bits of the same order as the input bits on line 15 and are connected to adder cells of the next consecutive stage shown as the second stage at t2. The output lines 18 from cells 16 carry carry bits of higher order 2 exp(n+1), and are connected to adder cells 19 of the second stage t2. Thus the output lines 17 and 18 of each respective adder cell 16 together may provide a partial sum having a value 0, corresponding to no matches, a value 2 exp 0, representing one match, a value 2 exp 1, representing two matches, or a value 2 exp 0 and 2 exp 1, representing three matches. The output bits from the first stage are clocked to the second stage synchronously with the clock signal on line 14. The next, third stage t3 contains parallel adder cells 16 for summing bits of the order 2 exp 0, adder cells 19 for summing bits of the order 2 exp 1, and adder cells 22 for summing bits of the order 2 exp 2, received from the previous stage t2. At each stage there may be provided parallel adder cells of the same order as at the previous stage, and adder cells for adding higher order bits, obtained as carry bits from a previous stage. Thus stage t4 has, in addition to cells 16, 19 and 22, which are utilized in previous stages, one or more cells 24 as it is necessary for adding bits of the order 2 exp 3. New, higher order cells are provided at consecutive stages, until the summed signal at the output from the summing circuit 13 is reduced to a separate single line for each bit order 2 exp 0 to 2 exp n, respectively, as it is shown by lines 25 to 30 in FIG. 1.

As it is seen from FIG. 1, the summing circuit 13 utilizes at some of the stages simple adder cells 33 which have only one input and one output. These cells 33 are utilized in the synchronous pipelined circuit 13 as one clock delay registers to compensate for signal delays in the parallel data paths, to thereby assure synchronous pipelined transfer of partial summation data bits on all the parallel paths through the array. The delays 33 are preferably implemented by a simple non-inverting D-type flip-flop, or by the same type of adder cell as shown at 16 in FIG. 2, with two of the three inputs equal to 0.

The above-described synchronous pipelined summing circuit 13 of FIG. 1 may be easily configured to have a nearly uniform cell distribution in the parallel signal path between its input and output. For example, the shift register may be split into two or more hardware sections, and each section arranged in close proximity to the cells of the first adder stage. As a result, the maximum number of cells across the first stage may be reduced by at least one half. For example, as it will be described with reference to the detailed circuit diagram of FIG. 3, both the shift register and adder cell array may be implemented by two identical cell array circuits 51, 52. Each of these circuits has a maximum of eight adder cells arranged across the cell array. Consequently, the "funneling" effect as it is known from the pyramid type pipeline is reduced and the density of elements in the consecutive stages is more evenly distributed. Therefore the lengths of connections between the stages are minimized. The above advantages contribute to the improved high speed of operation for any given electronic circuit technology which may be utilized to implement the correlator. For comparison, when adders having higher order combinational logic are utilized, as in the known digital correlators, the speed of operation is reduced in proportion to the highest order of the combinational logic. Also, the higher order adders are generally larger, and thus occupy more surface area on the chip. In turn, the connections between the stages must be made longer, whereby the routing time of the digital signal between the stages is extended. It will be appreciated also that each delay register 33 occupies about one half of the surface area occupied by a full adder cell. As it has been previously mentioned, the speed of operation of a digital correlator depends partly on the speed at which the data can be effectively transferred between the consecutive stages of the circuit. The above-described features of the summing circuit of the present invention reduce the data transfer time, thereby accelerating circuit operation. As an example, in the synchronous adder cell array of FIG. 1 the highest obtainable bit rate of the serial data stream is limited only by the operational delay inherent to the single bit full adder cell of the given circuit technology utilized, and the necessary interconnect delays.

In operation, the shift register 12 of the preferred embodiment shown in FIG. 1 receives via line 10 a serial data stream, which data stream may have random bit errors. At the arrival of the data the shift register begins to serially shift the data bits synchronously with the clock signal received on line 14. Thus at a first clock pulse the data bit on line 10 will be at the template output Q0 of the first series flip-flop included in the shift register 12, at the second clock pulse that bit will be at Q1-bar template output of the second series flip-flop, etc. Consequently, after a period of 48 clock pulses the thusly shifted data arrives at the the last template output Q47-bar. As it was described above, the parallel output bits from the template outputs of shift register 12, indicate bit-to-bit matches with the correlation word bits, and are summed by the consecutive stages t1 to t9 of the pipelined summing circuit 13. Because the summing circuit has 9 stages, each causing a latency of one clock cycle of the partial sum passing there through, there is a total latency of 10 clock cycles from the shift register input at DO to the summing circuit output at lines 25 to 30. Therefore, for each new 48-bit data word present at the parallel outputs Q0 to Q47 of the shift register 12 the sum of matching bits at the output lines 25 to 30 will be obtained 9 clock cycles later. There is an additional 1 clock cycle delay of the input data from input DO to output QO of the shift register. Therefore, for synchronization and alignment purposes, in the preferred embodiment the serial data stream is delayed by 10 clock cycles, so that it will line up with the correlation flag CW or CW-bar on lines 37, 39. The foregoing is obtained by outputting the delayed data on line 34 from the ninth series flip-flop output of the shift register 12. It will be understood however, that while the latency delays the data processing for a time period that is necessary to obtain the correlation sum, it does not influence the high operational speed of the correlator of the present invention in any manner.

The binary sum on lines 25 to 30, representing the number of bit matches detected by the shift register 12, is applied to a threshold comparator 20, as it is shown in FIG. 1. In the preferred embodiment the comparator 20 comprises a programmable read only memory (PROM), in which mutually exclusive selected high and low threshold comparison values are stored in the form of a lookup table. Lines 40, 41 are the previously described control lines for selecting a high or low threshold in the programmable threshold comparator 20. The obtained sum on lines 25 to 30 and the threshold selection lines represent a memory address. Each particular sum thus addresses a selected threshold value, as follows. When for example the frame sync high threshold is selected via line 40, and the sum is equal to 48, it addresses a high threshold exact match, and an exact match flag is output on line 37. When the frame sync low threshold is selected via line 40, and the sum is between 48 and 41, the correlator outputs a low threshold flag on line 37. Thus in response to either of these two match comparisons the synchronizing pulse on line 37 indicates a valid detection of the first correlation word CW, corresponding to the frame sync.

Analogously, when the block sync high threshold is selected via line 41, and the sum is for example equal to 0, the correlator outputs a high threshold non-match flag on line 39, indicating that none of the bits of the correlation word match. When the block sync low threshold is selected via line 41, and the sum is between 0 and 7, the correlator outputs a low threshold non-match flag on line 39. The last two non-match comparisons and the resulting synchronizing pulse on line 39 indicate detection of the second, complementary correlation word CW-bar. However, when the sum has a value between 8 and 40, it addresses memory locations indicating that neither a high or low threshold match has been obtained, and there is no synchronizing pulse provided on either line 37 or 39.

As it has been described above, for synchronization purposes it is desirable for the synchronizing pulses on lines 37, 39 to coincide in time with the last bit of the correlation word being compared in the shift register 12. To obtain the foregoing, the input data on line 10 is delayed by a necessary number of clock cycles to compensate for the delay due to the synchronous pipelined processing of the partial sum, and the threshold comparator. In the preferred embodiment the signal delay caused by the thres- hold comparator is one clock cycle.

Figure 3:
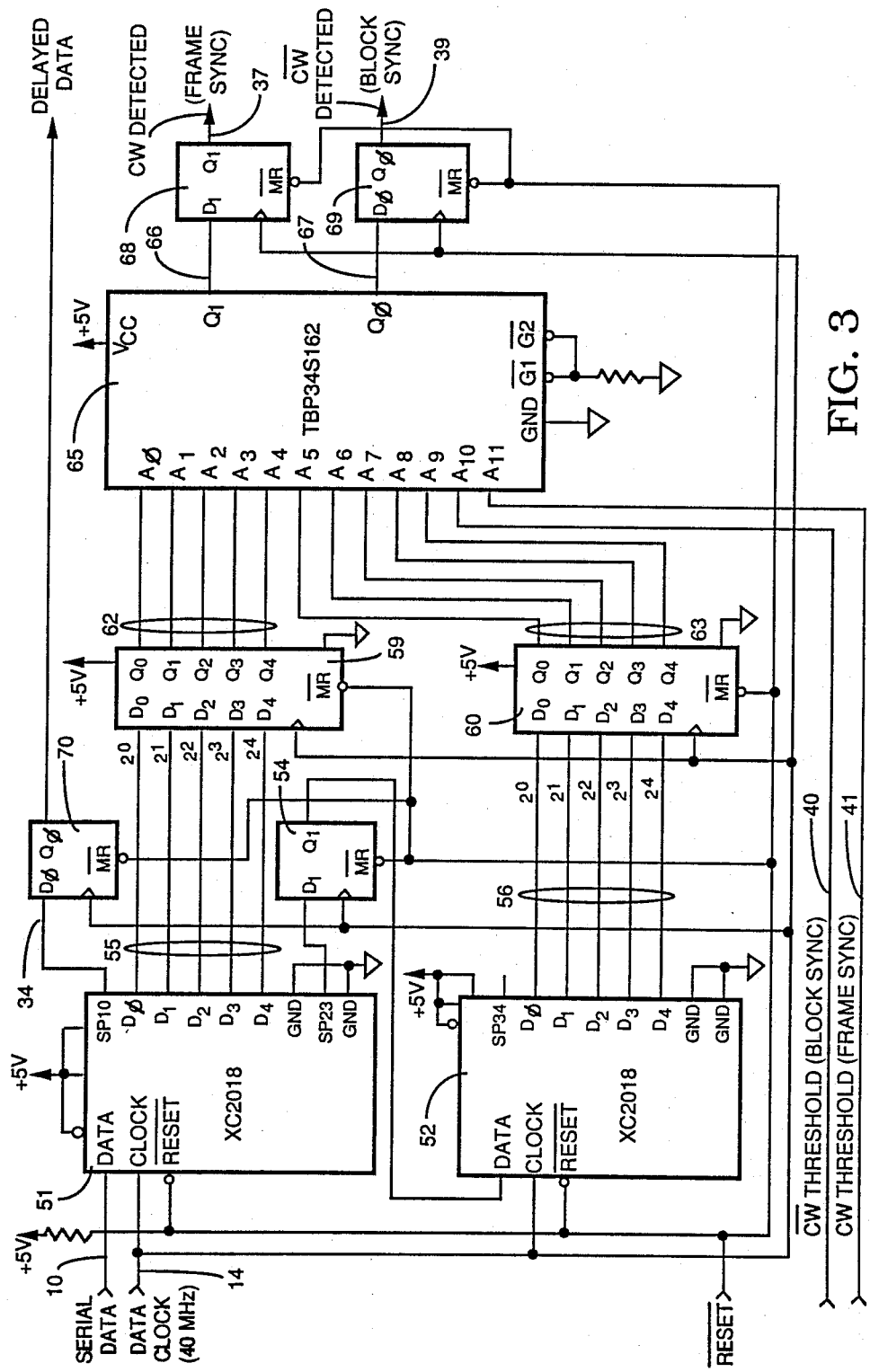
FIG. 3 is an example of implementation of the circuit of FIG. 1.

FIG. 3 shows an example of implementation of the high speed digital data correlator of FIG. 1, and will be described below. The 48-bit shift register 12 and summing circuit 13 of FIG. 1 are both implemented by two C-MOS logic cell arrays (LCA) 51, 52, type XC2018, manufactured by Xilinx Corporation. These LCA's are connected in series and each is programmed as a 24 bit serial-to-parallel shift register and synchronous pipelined single bit full adder cell array, and together they correspond to the shift register 12 and array 13 of FIG. 1. The serial data from the cell array 51 is reclocked by a flip-flop 54 which is utilized to speed up the synchronous operation of the connection between the LCA's 51 and 52.

In this particular implementation each cell array contains only one half, that is 24, of the 48 series flip-flops comprised in the shift register, and only those adder cells which are connected directly or indirectly to these flip-flops. Each cell array 51, 52 respectively provides a partial sum of 24 bit comparisons. These respective partial sums are applied via parallel lines 55, 56 to respective flip-flops 59, 60 for reclocking at 40 MHz. These flip-flops have a short setup time and propagation delay and thus serve as speed-up registers to increase the data access time for the following programmable read only memory (PROM) 65, including a lookup table. The PROM 65 is for example implemented as type TBP34S162 manufactured by Texas Instruments, and corresponds to the threshold comparator 20 of FIG. 1, while it also sums the two partial sums on lines 62, 63, as follows. The thusly reclocked partial sums are applied via lines 62, 63 to address inputs of PROM 65. The partial sums are summed by the lookup table, which also contains the various high and low threshold comparison values, which values are addressed by the sum, as it has been previously described with reference to FIG. 1.

When presence of the frame or block sync correlation word is detected by the PROM 65, it outputs a synchronizing pulse on line 66 or 67, respectively. Each sync pulse is reclocked synchronously with the data clock at 40 MHz by respective flip-flops 68, 69. The resulting reclocked sync pulses applied on lines 37, 38 from the flip-flops 68, 69 correspond to the synchronizing frame and block sync pulses CW, CW-bar, as previously described with reference to FIG. 1.

To synchronize the sync pulses on lines 37, 39 with the presence of the last bit of the frame sync or block sync correlation word in the shift register, the input data on line 10 is delayed by a necessary number of clock cycles, which in the preferred embodiment is 10 clock cycles, as it has been previously described. The thusly delayed data stream is applied from the shift register of gate array 51 via line 34 and is reclocked by flip-flop 70 at 40 MHz for speed-up purposes, to eliminate the slower output speed provided by the C-MOS LCA 51. It is an important consideration for the above-described embodiment of FIG. 3 that in accordance with the foregoing description all the flip-flops 54, 59, 60, and 68 to 70 are selected as being capable of fast reclocking of the data, preferably at 40 MHz, to allow processing at data rates higher than otherwise obtainable from the respective outputs of circuits 51, 52 and 65.

While the invention has been described and shown with reference to particular embodiments thereof, it will be appreciated that various alternative embodiments and modifications may be made which will fall within the scope of the appended claims.

What is claimed is:

1. A high speed digital data correlator for detecting a known correlation word in a serial data stream having a known data rate, comprising:

first means for storing respective bits of said known correlation word, for receiving said serial data stream and a clock signal synchronous therewith, said first means comparing said data stream bit-by-bit with said known correlation word at said data rate, said first means having parallel outputs, each providing an output signal of a first logic level when a bit match is obtained, and a second logic level when a bit match is not obtained;

synchronous pipelined single bit full adder cell array means for providing a binary sum indicating a number of bit matches obtained by said first means, said array means having consecutive stages, each adder cell having up to three inputs, each input of the same adder cell being coupled to receive a single bit of equal order of magnitude, and each adder cell having a summation output for outputting a single bit of the same order as that of its input bits, and a carry output for outputting a carry bit, the respective inputs of said adder cells of a first synchronous stage being coupled to respective outputs of said first means, respective inputs of adder cells from a second and said consecutive stages being coupled to respective outputs of adder cells of a previous stage, respectively; and second means for receiving said sum provided by said array means, comparing said sum with a predetermined threshold, and providing a synchronizing output signal when said comparison is obtained.

2. The correlator of claim 1, wherein said array means has respective parallel outputs, each carrying a binary summation bit of a respective order of magnitude, and wherein said second means receives said binary summation bits for said comparison with said threshold.

3. The correlator of claim 1 further comprising delay registers, each delaying an output signal from a particular adder cell of a preceding stage by one clock cycle to compensate for a signal processing delay provided by an adder cell coupled in parallel with said delay register.

4. The correlator of claim 1 wherein said second means is coupled to compare said sum with one of a selectable high and low threshold, and to provide a high threshold synchronizing output signal when said high threshold is selected and the sum is equal to said high threshold, and to provide a low threshold synchronizing output signal when said low threshold is selected and said sum is equal to or smaller than said high threshold and equal to or greater than said low threshold.

5. The correlator of claim 1 wherein a first and a second mutually exclusive correlation words are detected in said data stream, said second correlation word being a binary complement of said first correlation word, and wherein said second means provides a first synchronizing output signal corresponding to detection of said first correlation word when said binary sum is equal to or greater than a predetermined first threshold, and a second synchronizing output signal corresponding to detection of said second correlation word when said sum is equal to or smaller than a predetermined second threshold.

6. The correlator of claim 5 wherein said second means is coupled to compare said sum with one of a selectable high and low first and second threshold, and in response to a selected first and second high threshold to provide a first high threshold synchronizing output signal when said sum is equal to said first high threshold, and a second high synchronizing output signal when said sum is equal to said second high threshold, and in response to a selected first and second low threshold to provide a first low threshold synchronizing output signal when said sum is equal to said first high threshold or equal to or greater than said first low threshold, and to provide a second low synchronizing output signal when said sum is equal to said second high threshold or equal to or smaller than said second low threshold.

7. The correlator of claim 5 wherein said data stream is a digital signal reproduced from a magnetic recording medium utilizing a rotary head magnetic recording/reproducing circuit, said first correlation word is a frame sync indicating beginning of a head pass over the medium, and said second correlation word is a block sync indicating beginning of a data block within each head pass.

8. The correlator of claim 1 wherein said first means is a synchronous serial-to-parallel shift register means having a number of series connected flip-flops, each flip-flop having a non-inverting and an inverting output, respectively, said flip-flops being coupled to shift each received serial data bit by one bit position synchronously with each clock pulse, each flip-flop which is utilized to compare a binary one of said correlation word with said serial data stream has its non-inverting output coupled as one said output of said first means, and each flip-flop being utilized to compare a binary zero of said correlation word with said serial data stream has its inverting output coupled as one said output of said first means.

9. A high speed digital data correlator for detecting a known correlation word in a serial data stream having a known data rate, comprising:

serial-to parallel synchronous shift register means having a number of series connected flip-flop means, each flip-flop means having a non-inverting output and an inverting output, said flip-flop means being coupled to shift each received serial data bit by one bit position synchronously with said data rate, each flip-flop means being coupled to store a particular bit of said known correlation word and to compare that stored bit with said serial data stream bit-by-bit and to apply output data from its non-inverting output when said particular bit is a binary one, and to apply output data from its non-inverting output when said particular bit is a binary zero, said flip-flop means providing a logic signal of a first predetermined level in response to a match comparison, and signal of a second predetermined level in response to a non-match comparison;

means for summing said signals of said first logic level provided by said shift register, said summing means having a plurality of single bit full adder cells, each adder cell being coupled to receive up to three bits of equal order of magnitude, and to provide a summation bit output, and a carry bit output, said adder cells being arranged to form consecutive stages of a pipelined full adder cell array; and comparator means for receiving a sum provided by said summing means, comparing said sum to a selected threshold, and providing a synchronizing signal when said sum is equal to or exceeds said threshold.

10. The correlator of claim 9, wherein said comparator means comprises a programmable read only memory (PROM) means coupled to store respective sum values and selectable threshold values, and wherein an output signal from said summing means and a selected threshold value being coupled respectively to address said PROM. means to provide a synchronizing output signal when said sum is equal to or exceeds said selected threshold.

11. A high speed synchronous digital data correlator for detecting a known correlation word in a serial data stream having a known data rate, comprising:

first means for receiving and storing consecutive bits of said serial data stream and shifting said stored bits by one bit position in succession at said data rate, said first means being coupled to store respective bits of said known correlation word and to detect a match at corresponding bit positions between said stored data bits and said known correlation word bits, respectively, said first means having a plurality of parallel outputs, each providing an output signal of a predetermined logic level in response to a bit match;

second means having a plurality of single bit full logic adder cells arranged in a multistage synchronous pipelined array, for summing a number of matches obtained by said first means, each adder cell having respective inputs for receiving up to three single bits of equal order of magnitude, and having a summation bit output and a carry bit output, each said parallel output of said first means being coupled to one said input of an adder cell; and third means for receiving a sum provided by said second means and comparing said sum to a predetermined threshold.

* * * * *